United States Patent
Takeda et al.

(10) Patent No.: US 11,523,419 B2
(45) Date of Patent: Dec. 6, 2022

(54) USER TERMINAL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/253,425

(22) PCT Filed: Jun. 18, 2018

(86) PCT No.: PCT/JP2018/023146
§ 371 (c)(1),
(2) Date: Dec. 17, 2020

(87) PCT Pub. No.: WO2019/244214
PCT Pub. Date: Dec. 26, 2019

(65) Prior Publication Data
US 2021/0185709 A1 Jun. 17, 2021

(51) Int. Cl.
*H04W 72/12* (2009.01)
*H04L 1/06* (2006.01)

(52) U.S. Cl.
CPC ....... *H04W 72/1273* (2013.01); *H04L 1/0612* (2013.01); *H04W 72/1257* (2013.01); *H04W 72/1289* (2013.01)

(58) Field of Classification Search
None
See application file for complete search history.

(56) References Cited

U.S. PATENT DOCUMENTS

| | | | | |
|---|---|---|---|---|
| 2015/0131579 A1* | 5/2015 | Li | ............... | H04L 1/189 370/329 |
| 2019/0288757 A1* | 9/2019 | Zhou | ............... | H04B 7/0617 |
| 2019/0297603 A1* | 9/2019 | Guo | ............... | H04W 72/046 |
| 2019/0313426 A1* | 10/2019 | Lin | ............... | H04L 1/0007 |
| 2019/0342030 A1* | 11/2019 | Hosseini | ............... | H04L 1/00 |
| 2019/0342907 A1* | 11/2019 | Huang | ............... | H04L 5/0053 |
| 2019/0349116 A1* | 11/2019 | Hosseini | ............... | H04L 1/0025 |
| 2019/0372719 A1* | 12/2019 | Talarico | ............... | H04W 72/042 |
| 2019/0373486 A1* | 12/2019 | Bai | ............... | H04B 7/0617 |
| 2019/0387579 A1* | 12/2019 | Pao | ............... | H04L 5/0023 |
| 2020/0221428 A1* | 7/2020 | Moon | ............... | H04B 7/024 |

(Continued)

OTHER PUBLICATIONS

International Search Report issued in PCT/JP2018/023146 dated Aug. 14, 2018 (2 pages).

(Continued)

*Primary Examiner* — Jenkey Van
(74) *Attorney, Agent, or Firm* — Osha Bergman Watanabe & Burton LLP

(57) ABSTRACT

A user terminal according to an aspect of the present disclosure includes: a receiving section configured to receive a downlink shared channel transmitted from different transmission/reception points for each given number of repetitions; and a control section configured to control the reception of the downlink shared channel based on a transmission configuration indicator (TCI) state associated with a repetition among the given number of repetitions of the downlink shared channel or with a redundancy version of the downlink shared channel.

11 Claims, 12 Drawing Sheets

| FIELD VALUES IN DCI | TCI STATES FOR REPETITIONS |
|---|---|
| 000 | TCI STATE ID#0 FOR k = 0, TCI STATE ID#1 FOR k = 1, TCI STATE ID#2 FOR k = 2, ⋯ |
| 001 | TCI STATE ID#3 FOR k = 0, TCI STATE ID#1 FOR k = 1, TCI STATE ID#2 FOR k = 2, ⋯ |
| 010 | TCI STATE ID#0 FOR k = 0, TCI STATE ID#0 FOR k = 1, TCI STATE ID#0 FOR k = 2, ⋯ |
| ⋯ | ⋯ |

(56) References Cited

U.S. PATENT DOCUMENTS

2021/0044403 A1* 2/2021 Zhang .............. H04W 72/0406
2021/0091900 A1* 3/2021 Zhang ................ H04W 56/001
2021/0250972 A1* 8/2021 Munier ............. H04W 72/1236

OTHER PUBLICATIONS

Written Opinion of the International Searching Authority issued in PCT/JP2018/023146 dated Aug. 14, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 18923444.6, dated Dec. 16, 2021 (11 pages).
Huawei, HiSilicon; "PDSCH reliability for URLLC"; 3GPP TSG RAN WG1 Meeting #91, R1-1719407; Reno, USA Nov. 27-Dec. 1, 2017 (8 pages).
Samsung; "Remaining details on QCL"; 3GPP TSG RAN WG1#91, R1-1720315; Reno, USA; Nov. 27-Dec. 1, 2017 (11 pages).
Intel Corporation; "Remaining details of PDSCH repetitions"; 3GPP TSG RAN WG1 Meeting #93, R1-1806494; Busan, Korea; May 21-25, 2018 (4 pages).

* cited by examiner

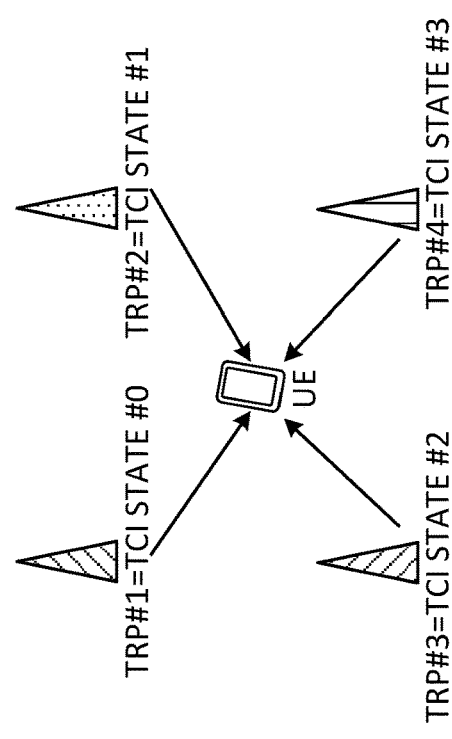
FIG. 2A
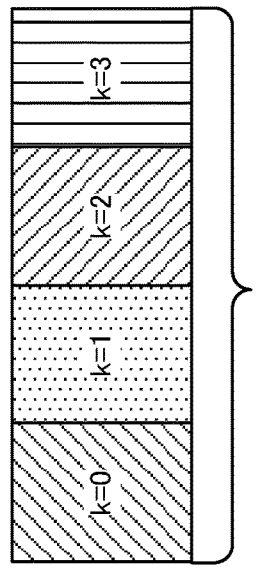
FIG. 2B
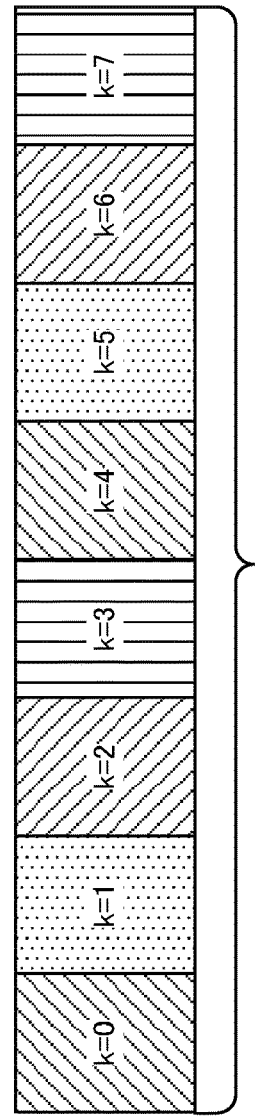

FIG. 3A
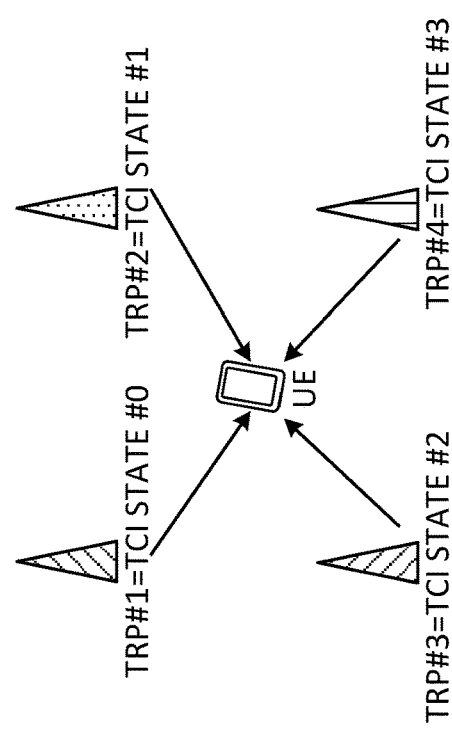
FIG. 3B
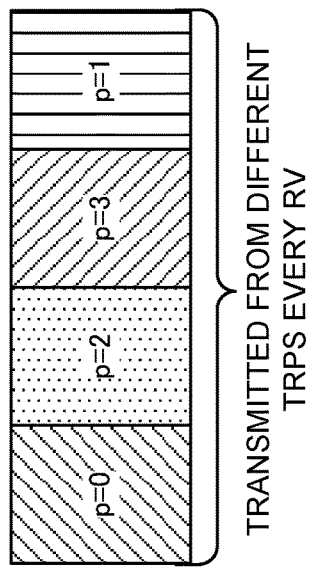
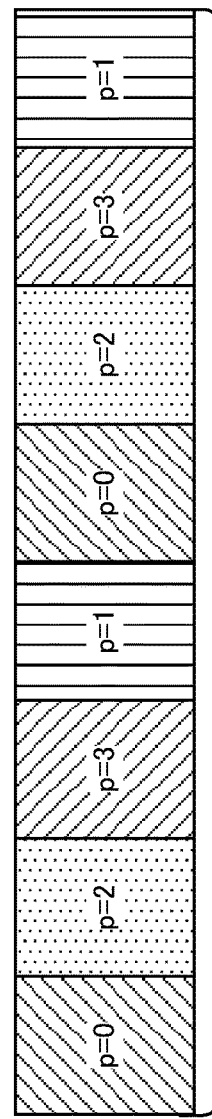

FIG. 4A

| FIELD VALUES IN DCI | TCI STATES FOR REPETITIONS |
|---|---|
| 000 | TCI STATE ID#0 FOR k = 0, TCI STATE ID#1 FOR k = 1, TCI STATE ID#2 FOR k = 2, ... |
| 001 | TCI STATE ID#3 FOR k = 0, TCI STATE ID#1 FOR k = 1, TCI STATE ID#2 FOR k = 2, ... |
| 010 | TCI STATE ID#0 FOR k = 0, TCI STATE ID#0 FOR k = 1, TCI STATE ID#0 FOR k = 2, ... |
| ... | ... |

FIG. 4B

| FIELD VALUES IN DCI | TCI STATES FOR REPETITIONS |
|---|---|
| 000 | TCI STATE ID#0 FOR p = 0, TCI STATE ID#1 FOR p = 2, TCI STATE ID#2 FOR p = 3, ... |
| 001 | TCI STATE ID#3 FOR p = 0, TCI STATE ID#1 FOR p = 2, TCI STATE ID#2 FOR p = 3, ... |
| 010 | TCI STATE ID#0 FOR p = 0, TCI STATE ID#0 FOR p = 2, TCI STATE ID#0 FOR p = 3, ... |
| ... | ... |

| FIELD VALUES IN DCI | TCI STATES FOR REPETITIONS |
|---|---|
| 000 | TCI STATE ID#0 |
| 001 | TCI STATE ID#3 |
| ... | ... |

FIG. 5

FIG. 6A
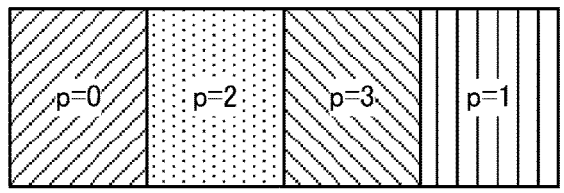
FIG. 6B
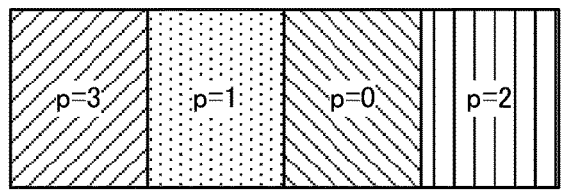
FIG. 6C
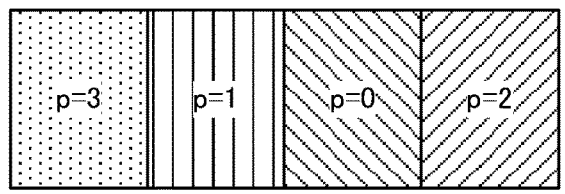
FIG. 6D
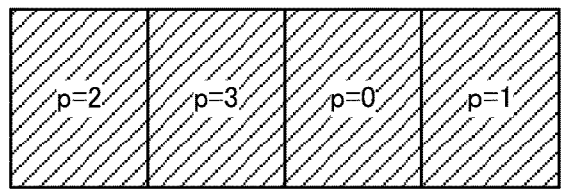
 PDSCH (TRP#1=TCI STATE #0)　　 PDSCH (TRP#3=TCI STATE #2)
 PDSCH (TRP#2=TCI STATE #1)　　 PDSCH (TRP#4=TCI STATE #3)

USER TERMINAL

TECHNICAL FIELD

The present disclosure relates to a user terminal in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delays and so on (see Non-Patent Literature 1). In addition, the specifications of LTE-A (LTE Advanced, LTE Rel. 10, 11, 12, 13) have been drafted for the purpose of further increasing the capacity and sophistication of LTE (LTE Rel. 8, 9).

Successor systems of LTE are also under study (also referred to as, for example, "FRA (Future Radio Access)", "5G (5th generation mobile communication system)", "5G+ (plus)", "NR (New Radio)", "NX (New radio access)", "FX (Future generation radio access)", "LTE Rel. 14", or "LTE Rel. 15 or later versions" and so on).

The conventional LTE system (such as LTE Rel. 8-14) is such that a user equipment (UE) controls reception of a downlink shared channel (such as PDSCH: Physical Downlink Shared Channel) on the basis of downlink control information (DCI, which may be referred to as DL assignment or the like) transmitted via a downlink control channel (such as PDCCH: Physical Downlink Control Channel). Also, the user terminal controls transmission of the uplink shared channel (for example, physical uplink shared channel (PUSCH)) based on the DCI (also referred to as UL grant).

CITATION LIST

Non Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

It has been discussed to configure future radio communication systems (such as NR, 5G, 5G+, or Rel.15 or later) such that the future radio communication systems will perform communication by using beam forming (BF). Thus, it has been discussed to configure a user terminal such that the user terminal will refer to information regarding quasi-co-location (QCL) of at least one of a given channel or signal (channel/signal) (QCL information) and will control a receiving process of the channel/signal (for example, at least one of demapping, demodulation, or decoding) on the basis of the QCL information.

The QCL information of the given channel/signal (for example, PDSCH, PDCCH, or the like) is also referred to as state (TCI state) of transmission configuration indication or transmission configuration indicator (TCI) of the channel/signal.

Meanwhile, it has been discussed to configure the aforementioned future radio communication systems such that downlink shared channels (for example, PDSCH) will be transmitted by repeated transmission (repetitions). Moreover, it has been discussed to configure the aforementioned future radio communication systems such that the downlink shared channels will be transmitted from different one of a plurality of transmission/reception points (TRP) for each given number of repetitions (for example, for each repetition).

However, in case where the downlink shared channel is transmitted from different TRPs for each given number of repetitions, there would be a possibility that the user terminal fails to appropriately recognize the TCI state of the downlink shared channel, thereby resulting in a failure to appropriately control the reception of the downlink shared channel.

Therefore, one of objects of the present disclosure is to provide a user terminal capable of appropriately controlling the reception of the downlink shared channel in case where the repeated transmission of the downlink shared channel is carried out from different TRPs.

Solution to Problem

A user terminal according to an aspect of the present disclosure includes: a receiving section configured to receive a downlink shared channel transmitted from different transmission/reception points for each given number of repetitions; and a control section configured to control the reception of the downlink shared channel based on a transmission configuration indicator (TCI) state associated with a repetition among the given number of repetitions of the downlink shared channel or with a redundancy version of the downlink shared channel.

Advantageous Effects of Invention

According to one aspect of the present disclosure, it becomes possible to appropriately control the reception of the downlink shared channel in case where the downlink shared channel is transmitted from different TRPs by repeated transmission.

BRIEF DESCRIPTION OF DRAWINGS

FIGS. 2A and 2B are diagrams illustrating illustrative examples of TCI states associated with repetition indices according to a first aspect.

FIGS. 3A and 3B are diagrams illustrating illustrative examples of TCI states associated with RV indices p according to a second aspect.

FIG. 4A is a diagram illustrating examples of DCIs each indicating TCI state IDs for the repetition indices k.

FIG. 4B is a diagram illustrating examples of DCIs each indicating TCI state IDs for the RV indices p.

FIG. 5 is a diagram illustrating DCIs each indicating a single TCI state ID.

FIGS. 6A to 6D are diagrams indicating illustrative examples of relationships between the TCI states indicated in the TCI fields and RVs indicated in the RV fields.

DESCRIPTION OF EMBODIMENTS

It has been discussed to configure future radio communication systems (such as NR, 5G, 5G+, or Rel.15 or later) such that at least either a channel or a signal (channel/signal) will be transmitted by repeated transmission. More specifically, it has been discussed to configure the future radio communication systems such that the channel/signal will be transmitted by repeated transmission by using a plurality of transmission/reception points (TRPs).

Examples of the channel/signal include PDSCH, PDCCH, PUSCH, PUCCH, DL-RS, uplink reference signal (UL-RS), and the like, but the channel/signal is not limited to these.

Figure 1A:
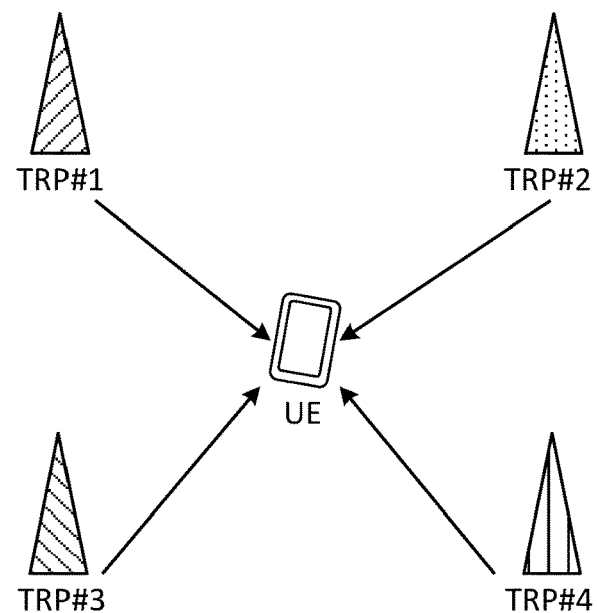
FIGS. 1A and 1B are diagrams illustrating illustrative examples of repeated transmission of channel/signal by using a plurality of TRPs.
Figure 1B:
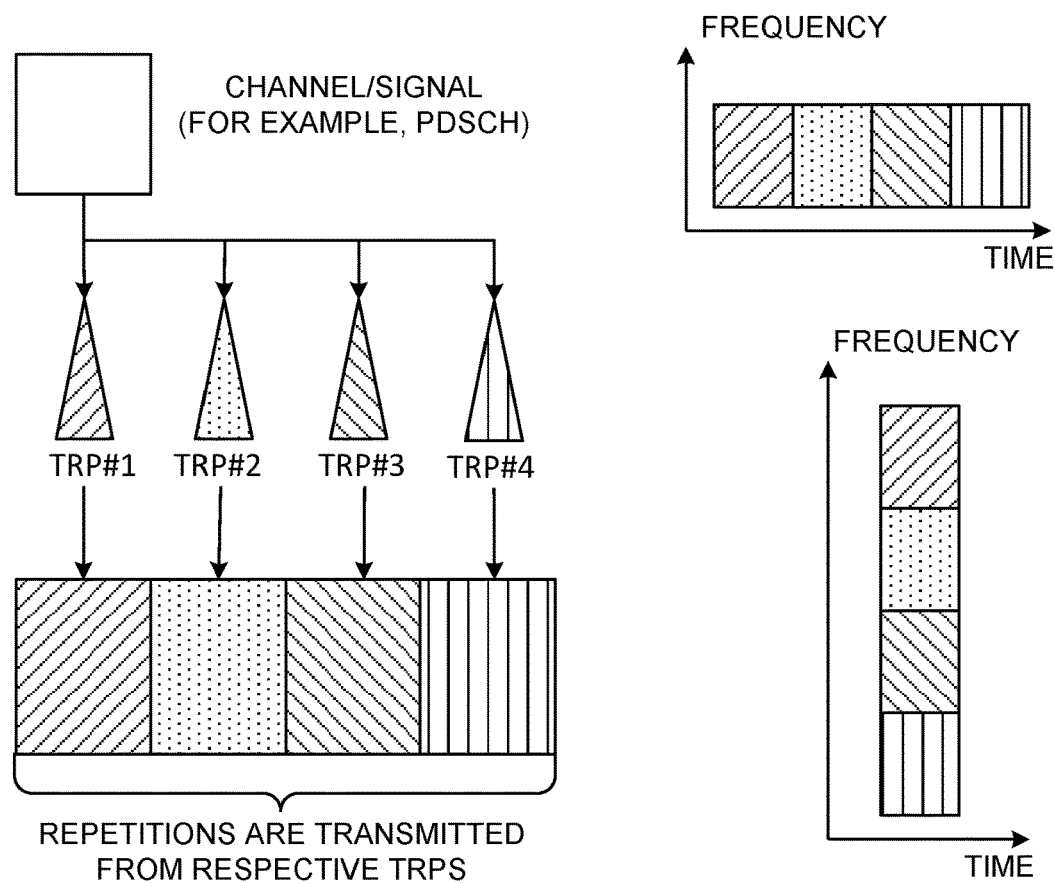

FIGS. 1A and 1B are diagrams illustrating illustrative examples of repeated transmission of channel/signal by using a plurality of TRPs. For the illustrative purposes, FIGS. 1A and 1B illustrate example of repeated transmission of PDSCH by using TRP #1 to TRP #4. It should be noted that the present invention is not limited to the example illustrated in FIG. 1A where the TRP #1 to TRP #4 have different geographic locations (TCI states). The TRP #1 to TRP #4 may be different antenna panels provided at the same transmission site. Moreover, the number of TRPs used for the repeated transmission is not limited to the number as illustrated in the drawings.

As illustrated in FIG. 1B, the repeated transmission may be such that the same PDSCH (or DL data) is copied by a plurality of TRPs and is transmitted as repetitions. Here, what is meant by "copying the DL data" may be copying at least one of an information bit sequence, a code block, a transport block, or a post-coding code word sequence, which constitutes the DL data.

As an alternative, what is meant by "copying the DL data" may not be copying a bit sequence as a whole, but may be at least part of code words generated from an information bit sequence or copying at least part of a demodulated symbol sequence. For example, a plurality of pieces of DL data copied may be such that RVs of the code words thus obtained by coding a certain information bit sequence may be identical with each other or different from each other among the plurality of pieces of DL data copied. As an alternative, a plurality of pieces of DL data may be demodulated symbol sequences obtained by demodulating such different or identical RVs. Each of the plurality of pieces of DL data is transmitted as PDSCH. The PDSCH may be such that at least either a time domain or a frequency domain is repeated in different resources.

For example, as illustrated in FIG. 1B, the PDSCH may be repeated in resources identical in frequency domain but sequential in time domain (for example, one or more slots). As an alternative, the PDSCH may be repeated in resources identical in time domain but sequential in frequency domain (for example, one or more resource blocks (RB) or an RB group (RBG) including one or more RBs). The repetitions may be transmitted to different TRPs.

Even though FIG. 1B illustrates such a case where each of the plurality of resources for different repetitions is sequential in time domain or frequency domain, but the plurality of resources may be non-sequential. Moreover, the plurality of resources may be such resources that are different from each other in terms of both of the time domains and frequency domains.

Moreover, even though FIG. 1B illustrates such a case where PDSCH is transmitted to different TRPs for each repetition, but the present invention is not limited to this, and PDSCH may be transmitted to different TRPs for each given number of repetitions (one or more repetitions).

It should be noted that the "TRP" may be replaced to read as different terms such as a network, a radio base station, an antenna device, an antenna panel, a serving cell, a cell, a component carrier (CC), a carrier, or the like. Moreover, a phase "TRPs are identical" for different transmission/reception signals or channels may be replaced to read as such a phase that TCI states, QCLs, or QCL relationships are identical between the different transmission/reception signals or channels or between reference signals of the different transmission/reception signals or channels. Moreover, a phase "TRPs are different" for different transmission/reception signals or channels may be replaced to read as such a phase that TCI states, QCLs, or QCL relationships are different between the different transmission/reception signals or channels or between reference signals of the different transmission/reception signals or channels.

(QCL)

For the future radio communication system, it has been discussed that a user terminal will refer to information regarding quasi-co-location (QCL) of at least one of a given channel or signal (channel/signal) (QCL information), and will control a receiving process of the channel/signal (for example, at least one of demapping, demodulation, or decoding) on the basis of the QCL information.

The QCL is herein an index showing the statistical properties of the channel/signal. In one example, in the case where a signal and another signal have QCL relationship, which means that at least one of Doppler shift, Doppler spread, average delay, delay spread, and spatial parameter (e.g., spatial reception parameter or spatial Rx parameter) is assumable to be the same between these different signals (QCL for at least one of these) of them.

Moreover, the spatial reception parameter can correspond to the reception beam of the user terminal (e.g., reception analog beam), and the beam can be specified on the basis of the spatial QCL. The QCL and least one element of the QCL is herein used interchangeably with sQCL (spatial QCL).

The QCL can be specified as a plurality of types (QCL types). In one example, four QCL types A to D of different parameters (or parameter sets) that are assumable to be identical can be provided, which parameters are shown below:

QCL type A: Doppler shift, Doppler spread, average delay, and delay spread
QCL type B: Doppler shift and Doppler spread
QCL type C: Doppler shift and average delay
QCL type D: spatial reception parameter As to transmission configuration indication or transmission configuration indicator (TCI), a state thereof (TCI-state) may be so configured to indicate (include) QCL information of a given channel/signal (for example, PDSCH, PDCCH, PUCCH, PUSCH, or the like).

The TCI state may be identified with a given identifier (TCI-StateId), and may be configure to indicate (include) information (QCL information (QCL-Info)) regarding QCL between a channel/signal in question (or a reference signal for the channel (or an antenna port of the reference signal)) and another signal (for example, another downlink reference signal (DL-RS)).

The QCL information may include, for example, at least one of information regarding DL-RS having a QCL relationship with the channel/signal in question (DL-RS relating information), information indicating the type of the QCL (QCL type information), a carrier on which the DL-RS is to be provided (cell), or information regarding BWP.

The DL-RS related information can include a piece of information indicating at least one of DL-RS having a QCL relationship with the channel/signal in question and a resource of DL-RS. In one example, in the case where a plurality of reference signal sets (RS sets) is configured in the user terminal, the DL-RS related information can indicate at least one of DL-RS having QCL relationship with a channel (or a port for the channel) among RSs included in the RS set, a resource for the DL-RS, or the like.

Here, for example, DL-RS can be at least one of a synchronaization signal (SS), a physical broadcast channel (PBCH), a synchronization signal block (SSB), a mobility reference signal (MRS), a channel state information reference signal (CSI-RS), a CSI-RS for tracking, a beam-specific signal, or a signal constituted by expanding or changing such signal (e.g., a signal constituted by changing at least one of density and periodicity).

The synchronization signal can be, in one example, at least one of a primary synchronaization signal (PSS) and a secondary synchronaization signal (SSS). The SSB is a signal block including a synchronization signal and a broadcast channel, and can be called an SS/PBCH block or the like.

<TCI State for PDCCH>

The TCI state for PDCCH may include the QCL information regarding the QCL for PDCCH. More specifically, the TCI state may include QCL information regarding the QCL between a demodulation reference signal (DMRS) for PDCCH, (an antenna port for the DMRS (DMRS port) or a group of the DMRS port (DMRS port group)) and the DL-RS.

One or more TCI states may be configured for each control resource set (CORESET) for a user terminal. Moreover, in case where one or more TCI states are configured per CORESET, one of the one or more TCI states may be activated.

The user terminal may be configured such that, on the basis of the TCI state associated to (or activated for) a CORESET, the user terminal decides the QCL regarding PDCCH. More specifically, the user terminal may be configured such that the user terminal controls a receiving process (for example, decoding, demodulation, and/or the like) of the PDCCH on the assumption that the DMRS (DMRS port or DMRS port group) for the PDCCH has a Quasi-Co-located with the DL-RS corresponding to the TCI state.

At least either the configuring or activation of the one or more TCIs is carried out by higher layer signaling. The higher layer signaling may be, for example, any of RRC (Radio Resource Control) signaling, MAC (Medium Access Control) signaling, broadcast information and so on, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), or the like.

For example, the configuring of the one or more TCI states per CORESET may be carried out by an RRC control element "TCI-StatesPDCCH". Moreover, activation or deactivation of the TCI state thus configured may be controlled by MAC CE.

Further, a given number (e.g., three or less) of CORESETs can be configured for each bandwidth part (BWP) configured in the user terminal in the serving cell.

Here, the BWP is a partial frequency band configured in a carrier (also referred to as a cell, a serving cell, a component carrier (CC), etc.), which is also called a partial frequency band or the like. The BWP may include a BWP (UL BWP, uplink BWP) for an uplink (UL) and a BWP (DL BWP, downlink BWP) for a downlink (DL). Each BWP to which the above-mentioned given number of CORESETs is given can be a DL BWP.

Moreover, a CORESET may be associated with a search space including one or more PDCCH candidates. One or more search spaces may be associated with each CORESET. The user terminal may be configured to monitor the search spaces in order to detect PDCCH (DCI).

The PDCCH candidate is a resource unit to which one PDCCH is mapped, and for example the PDCCH candidate may include as many control channel elements (CCEs) as required for an aggregation level. The search space may include as many PDCCH candidates as required for the aggregation level.

Moreover, the terms "monitoring of CORESET", "monitoring of search space (or SS set)", "monitoring of PDCCH candidate (or one or more set of PDCCH candidate (PDCCH candidate set)", "monitoring of downlink control channel (e.g., PDCCH)", and "monitoring of downlink control information (DCI)" are herein used interchangeably with each other. In addition, the term "monitoring" is used interchangeably with "at least one of blind decoding and blind detection".

<TCI State for PDSCH>

The TCI state for PDSCH may include the QCL information regarding the QCL for PDSCH. More specifically, the TCI state may include QCL information regarding the QCL between a DMRS for PDSCH or a port of the DMRS and the DL-RS.

The user terminal can be notified (configured) of M (M≥1) TCI states for PDSCH (M pieces of QCL information for PDSCH) via higher layer signaling. Moreover, the number M of TCI states configured in the user terminal can be limited by at least one of the user terminal capability and the QCL type.

The DCI used for scheduling of PDSCH can include a given field (e.g., also referred to as a field for TCI, a TCI field, a TCI state field, etc.) indicating the TCI state (QCL information for PDSCH). The DCI can be used for PDSCH scheduling of one cell, and can be referred to as, in one example, DL DCI, DL assignment, DCI format 1_0, DCI format 1_1, or the like.

The TCI field may include a given number of bits (for example, 3 bits). Whether or not the TCI field is included in the DCI may be controlled by information provided from a base station to the UE. The information may be information (TCI-PresentInDCI) indicating whether the TCI field is present or absent in the DCI (present or absent). The TCI-PresentInDCI may be configured in the user terminal, for example, by a higher layer signaling (an information element (IE) of RRC).

In the case where the DCI includes an x-bit (e.g., x=3) TCI field, the base station can configure previously up to $2^x$ (e.g., 8 for x=3) types of TCI state to the user terminal by using higher layer signaling. The value of the TCI field in the DCI (TCI field value) can indicate one of TCI states that are configured previously via higher layer signaling.

In the case where more than eight types of TCI states are configured in the user terminal, eight or less types of TCI states can be activated (specified) using MAC CE. The value of the TCI field in the DCI can indicate one of the TCI states activated by MAC CE.

The user terminal may be configured such that, on the basis of the TCI state indicated by the TCI field value in the DCI, the user terminal decides the QCL regarding PDSCH. More specifically, the user terminal may be configured such that the user terminal controls a receiving process (for example, decoding, demodulation, and/or the like) of the PDSCH on the assumption that the DMRS (DMRS port or DMRS port group) for the PDSCH has a QCL relationship with the DL-RS corresponding to the TCI state provided in the DCI.

The user terminal may be configured such that, if TCI-PresentInDCI for a CORESET for scheduling PDSCH is active, the user terminal assumes that a TCI field is present (included) in the DL DCI of a PDCCH to be transmitted in the CORESET.

The user terminal may be configured such that, if TCI-PresentInDCI for a CORESET for scheduling PDSCH is inactive, or if PDSCH is scheduled by DCI format 1_0, the user terminal assumes, in deciding the antenna port QCL for the PDSCH, that the TCI state for the PDSCH is identical with a TCI state applied to the CORESET used for the transmission of the PDCCH. It should be noted that the words "antenna port (port)" in the present disclosure may be replaced to read as an antenna port group (port group).

As illustrated in FIGS. 1A and 1B, in case where PDSCH is transmitted from different TRPs for each given number of repetitions, it is assumed that the TCI states for the PDSCH would be possibly different for each given number of repetitions if a geographic relationship between the different TRPs and the user terminal.

However, the method of notifying the TCI states for the PDSCH is not on such assumption that the PDSCH would be possibly transmitted from different TRPs for each given number of repetitions, therefore there is a possibility that the user terminal would fail to appropriately recognize the TCI states for the PDSCH for individual ones of the given number of repetitions.

In view of this, the present inventors arrived at such a configuration that makes it possible for the user terminal to appropriately control reception of PDSCH even if the PDSCH is transmitted from different TRPs for each given number of repetitions, the configuration associating the TCI states with the repetitions of PDSCH (first aspect) or redundancy versions (second aspect).

Now, the present embodiment will be described below in detail with reference to the drawings. The following will describe an example where PDSCH is transmitted from different TRPs for each repetition, but as described above, it is only required that the PDSCH be transmitted from different TRPs for each given number of repetitions (one or more repetitions).

Moreover, the following will mainly describe an example where the repeated transmission of PDSCH is carried out with resources different in time domain. As described above, however, it is only required that the repeated transmission of the PDSCHs be transmitted with resources different in at least either the time domain or the frequency domain.

Moreover, in the following, what is meant by "transmitting a plurality of channels/signals from different TRPs" is identical with what is meant by the plurality of channels/signals having different TCI states (also referred to as QCL or QCL information). The user terminal may be so configured that, if the user terminal receives a plurality of channels/signals having different TCI states, the user terminal assumes the plurality of channels/signals will be transmitted from different TRPs. Therefore, what is meant by "receiving channels/signals transmitted from different transmission/reception points for each given number of repetitions" is identical with what is meant by receiving channels/signals having different TCI states (also referred to as QCL or QCL information) for each given number of repetitions.

(First Aspect)

In a first aspect, a user terminal controls the reception of PDSCH on the basis of TCI states associated with repetitions of the PDSCH repeated by a given number of times (for example one repetition). More specifically, the user terminal may be so configured that the user terminal assumes that one or more antenna ports for DMRS of PDSCH are quasi-co-located as DL-RS indicated by the TCI states.

It may be so configured that the repetitions of the PDSCH are identified with given indices (repetition indices) k. The repetition indices k may indicate that a certain repetition is n-th repetition. For example, the repetition indices k=0, 1, 2, . . . , K−1 may indicate that the repetitions are 1st, 2nd, 3rd . . . K-th repetitions.

Moreover, the overall number of the repetition of PDSCH may be referred to as repetition factor K. For example, the repetition factor K is set to 2, 4, or 8, but is not limited to these.

It may be so configured that at least either the repetition indices k or the repetition factor K is transmitted to the user terminal by at least either by the higher layer signaling (for example, RRC signaling, MAC CE, or the like) or by physical layer signaling (for example, DCI).

In case where the PDSCH is transmitted from different TRPs for each given number of repetition, the TCI states may be such that the TCI states are associated with the given number of repetitions (for example, one repetition), or with the repetition indices k indicating the given number of repetitions.

FIGS. 2A and 2B are diagrams illustrating illustrative examples of TCI states associated with repetition indices according to a first aspect. Even though FIGS. 2A and 2B respectively assume the repetition factors K of 4 and 8, the repetition factor K is not limited to these values.

Moreover, FIGS. 2A and 2B assume that a Y number of TCI states are configured for the user terminal (Y number of TCI states are provided to the user terminal from the TRPs) by higher layer signaling.

As illustrated in FIGS. 2A and 2B, the repetition indices k (k=0, 1, 2, . . . , K−1) may be associated with given TCI state identifiers (TCI state IDs) y. More specifically, the repetition indices k may be associated with a reminder (y mod Y) of modulo operation of the TCI state IDs y by the overall number Y of the TCI states configured for the user terminal.

For example, in FIG. 2A, the repetition indices k=0, 1, 2, and 3 are associated with the TCI state IDs y=0, 1, 2, and 3, respectively. Moreover, the PDSCHs of the repetition indices k=0, 1, 2, and 3 are transmitted respectively from the TRP #1, #2, #3, and #4 corresponding to the TCI state IDs y=0, 1, 2, and 3, respectively.

Further, in FIG. 2B, the repetition indices k=0, 1, 2, 3, 4, 5, 6, and 7 are associated with the TCI state IDs y=0, 1, 2, 3, 0, 1, 2, and 3, respectively. Moreover, the PDSCHs of the repetition indices k=0, 1, 2, 3, 4, 5, 6, and 7 are transmitted respectively from the TRP #1, #2, #3, #4, #1, #2, #3, and #4 corresponding to the TCI state IDs y=0, 1, 2, 3, 0, 1, 2, and 3, respectively.

It may be so configured that the information indicating the TCI state IDs corresponding to the repetition indices k are provided to the user terminal from the TRPs by at least either the higher layer signaling (for example, the RRC signaling, MAC CE, or the like) or physical layer signaling (for example, DCI). As an alternative, the user terminal may be so configured that, based on the repetition index k, the overall state Y of the TCI states, and/or the like, the user terminal derives a TCI state ID corresponding to the repetition index k.

Moreover, even though FIGS. 2A and 2B assume that the different TCI state IDs (TRPs) are associated respectively with the repetition indices k, but the present invention is not limited to this. It may be so configured that at least part of the repetitions in the repetition factor K is associated with the different TCI state IDs (TRPs). In the other word, at least part of the repetitions in the repetition factor K may be associated with the same TCI state (TRP).

Moreover, in FIGS. 2A and 2B, the RVs (values of RV indices p) of the repetitions in the repetition factor K may be fixed or circulated in a given order.

In the first aspect, the TCI states are associated with the repetitions of PDSCH (or repetition indices k), whereby the user terminal can appropriately control the reception of the PDSCH even if the PDSCH is transmitted from different TRPs for each given number of repetitions.

(Second Aspect)

A second aspect is so configured that a user terminal controls reception of the PDSCH on the basis of the TCI states associated with redundancy version (RV) of the PDSCH. The second aspect will describe mainly differences from the first aspect.

The RV of PDSCH may be fixed among the K times of repetitions or may be circulated in a given order (for example, 0→2→3→1). The RV may be identified with given indices (RV indices) p.

It may be so configured that, in case where the PDSCH is transmitted from different TRPs for each given number of repetitions, the TCI states are associated with the RVs or with the RV indices p indicating the RVs.

FIGS. 3A and 3B are diagrams illustrating illustrative examples of the TCI states associated with the RV indices p according to the second aspect. For FIGS. 3A and 3B, the features identical with those in FIGS. 2A and 2B will not be explained repeatedly, but differences from FIGS. 2A and 2B will be mainly explained.

As illustrated in FIGS. 3A and 3B, it may be so configured that the RV indices p are associated with given TCI state identifiers (TCI state IDs) y (or the TCI states of the TCI state IDs). For example, the RV indices p may be associated with a reminder (y mod Y) of modulo operation of the TCI state IDs y by the overall number Y of the TCI states configured for the user terminal.

For example, in FIG. 3A, the RV indices p=0, 2, 3, and 1 are associated with the TCI state IDs y=0, 1, 2, and 3, respectively. Moreover, the PDSCHs of the RV indices p=0, 2, 3, and 1 are transmitted respectively from the TRPs #1, #2, #3, and #4 corresponding to the TCI state IDs y=0, 1, 2, and 3, respectively.

Moreover, in FIG. 3B, the RV indices are circulated in a given order (for example, 0→2→3→1), therefore, the RV indices p of the repetition indices k=0, 1, 2, 3, 4, 5, 6, and 7 are respectively p=0, 1, 2, 3, 0, 1, 2, and 3. In FIG. 3B, the PDSCHs of the RV indices p=0, 2, 3, and 1 are transmitted respectively from the TRPs #1, #2, #3, and #4 corresponding to the TCI state IDs y=0, 1, 2, and 3.

It may be so configured that the information indicating the TCI state IDs corresponding to the RV indices p are provided to the user terminal from the TRPs by at least either the higher layer signaling (for example, the RRC signaling, MAC CE, or the like) or physical layer signaling (for example, DCI). As an alternative, the user terminal may be so configured that, based on the RV indices p, the overall state Y of the TCI states, and/or the like, the user terminal derives a TCI state ID corresponding to the RV indices p.

Moreover, even though FIGS. 3A and 3B assume that the different TCI state IDs (TRPs) are associated respectively with the RV indices p, but the present invention is not limited to this. It may be so configured that at least part of the RVs in the repetition factor K is associated with the different TCI state IDs (TRPs). In the other word, at least part of the RVs in the repetition factor K may be associated with the same TCI state (TRP).

In the second aspect, the TCI states are associated with the RVs (or RV indices p), whereby the user terminal can appropriately control the reception of the PDSCH even if the PDSCH is transmitted from different TRPs for each given number of repetitions.

(Third Aspect)

In a third aspect, DCIs will be described, which indicate the TCI states associated with the repetition indices k (repetitions) or the RV indices p (RV) in the first aspect or the second aspect.

Example 1

The user terminal may be so configured to receive a DCI for scheduling the PDSCH for all of the repetitions. Given field values in the DCIs may indicate TCI states of the repetition indices k or the RV indices p.

The given fields may be referred to as TCI fields, TCI state fields, fields for the TCI fields, first fields, or the like. Moreover, the given fields may be included, for example, in case where the higher layer signaling designates given information (for example, tci-PresentInDCI). Moreover, the given fields may be constituted by a given number of bits (for examples, 3 bits).

In Example 1, a given field value in the DCI may indicate one or more TCI state IDs. FIG. 4A is a diagram illustrating illustrative examples of such DCIs indicating the TCI state IDs of repetition indices k. FIG. 4B is a diagram illustrating examples of DCIs each indicating TCI state IDs for the RV indices p. It should be noted that FIGS. 4A and 4B are merely for illustrative purposes, and the bit number, the values, the TCI state IDs indicated by the values, etc. in the given field in the DCIs are not limited to those illustrated in FIGS. 4A and 4B.

As illustrated in FIG. 4A, the values of the given fields in the DCI may indicate the TCI state IDs of each of the repetition indices k in the repetition factor K. For example, in FIG. 4A, individual values in the given field indicate the TCI states ID of the repetition indices k in the repetition factor K (for example, the value 000 indicates the TCI state ID #0 for k=0, the TCI state ID #1 for k=1, the TCI state ID #2 for k=2, and so on).

On the contrary, as illustrated in FIG. 4B, the values of the given fields in the DCI may indicate the TCI state IDs of each of the RV indices p in the repetition factor K. For example, in FIG. 4B, individual values in the given field indicate the TCI states ID of the RV indices p in the repetition factor K (for example, the value 000 indicates the TCI state ID #0 for p=0, the TCI state ID #1 for p=2, the TCI state ID #2 for p=3, and so on).

As illustrated in FIGS. 4A and 4B, even in the configuration in which a single DCI schedules all the repetitions of the PDSCH of the repetition factor K, the user terminal can recognize the TCI states of the repetitions in the repetition factor K or the RVs on the basis of the given field values in the DCIs.

It should be noted that, in the configurations illustrated in FIGS. 4A and 4B, the DCI may include another field indicating the repetition factor K. As an alternative, the repetition factor K may be indicated by the given field value. For example, the user terminal may be so configured that a value obtained by adding 1 to a maximum value of the repetition indices k is determined as the repetition factor K.

Example 2

As an alternative, it may be configured such that the user terminal receives the DCI scheduling the PDSCH for each given number of repetitions (for example, one repetition). The given field value in the DCI may indicate the TCI state of an individual repetition among the given number of repetitions.

In Example 2, the given field value in the DCI may be such a value that indicates a single TCI state ID. For example, in case where the DCI is transmitted for each given index k, the DCI may be such that the given field value in the DCI indicates the TCI state ID of the repetition index k scheduled by the DCI.

FIG. 5 is a diagram illustrating DCIs each indicating a single TCI state ID. For example, in FIG. 5, it may be so configured that a single DCI is used for scheduling a PDSCH of a repetition index k. In this case, it may be so configured that the given field in the DCI indicates a TCI state ID of that repetition index k.

As an alternative, it may be so configured that a single DCI is used for scheduling a PDSCH of a RV index p. In this case, it may be so configured that the given field in the DCI indicates a TCI state ID of that RV index p.

<Miscellaneous>

The DCI may include, in addition to the TCI field, a given field indicating the RV index (or RV) (for example, the given field may be referred to as a second field, an RV field, an RV index field, or the like). The RV field may be constituted by a given number of bits (for example, 2 bits).

FIGS. 6A to 6D are diagrams indicating illustrative examples of relationships between the TCI states indicated in the TCI fields and RVs indicated in the RV fields. For the illustrative purposes, FIGS. 6A to 6D illustrate the cases where the repetition factor K is 4, but the present invention is not limited to this.

Moreover, in FIGS. 6A to 6D, the PDSCH of the repetition factor K may be scheduled by the same single DCI or may be scheduled by DCIs each for the respective repetition indices k.

In FIG. 6A, it may be so configured that the values in the TCI fields in the DCIs (for example, as in FIGS. 4A and 5) indicate the respective TCI state IDs=0, 1, 2, and 3 corresponding to the repetition indices k=0, 1, 2, and 3. On the other hand, because the RV field in the DCI indicates the RV index of 0, the RV indices p=0, 2, 3, and 1 for the repetition indices k=0, 1, 2, and 3 may be indicated in the given order.

In FIG. 6B, the TCI states ID of the repetition indices k are indicated as in FIG. 6A. On the other hand, as the value in the RV field in the DCI indicates the RV index of 3, the RV indices p=3, 1, 0, and 2 for the repetition indices k=0, 1, 2, and 3 may be indicated in the given order.

In FIG. 6C, it may be so configured that the TCI state IDs=1, 3, 2, and 0 respectively corresponding to the repetition indices k=0, 1, 2, and 3 are indicated by the value in the TCI field in the DCI (for example, as in FIGS. 4A and 5). The RV indices of the repetition indices k are indicated as in FIG. 6B.

In FIG. 6D, it may be so configured that the values in the TCI fields in the DCIs (for example, as in FIGS. 4A and 5) indicate the same TCI state IDs=0 for the repetition indices k=0, 1, 2, and 3. In addition, because the RV field in the DCI indicates the RV index of 2, the RV indices p=2, 3, 1, and 0 for the repetition indices k=0, 1, 2, and 3 may be indicated in the given order.

As described above, the RV indices (RV sequence) and the TCI states may be associated with each other, and may be designated in separate fields.

In the third aspect, the given field value of the DCI indicates the TCI states associated with the repetitions of PDSCH or with RVs, whereby the user terminal can appropriately control the reception of the PDSCH even if the PDSCH is transmitted from different TRPs for each given number of repetitions.

(Radio Communication System)

Now, the structure of a radio communication system according to the present embodiment will be described below. In this radio communication system, communication is performed using one or a combination of the radio communication methods according to the embodiments of the present disclosure.

Figure 7:
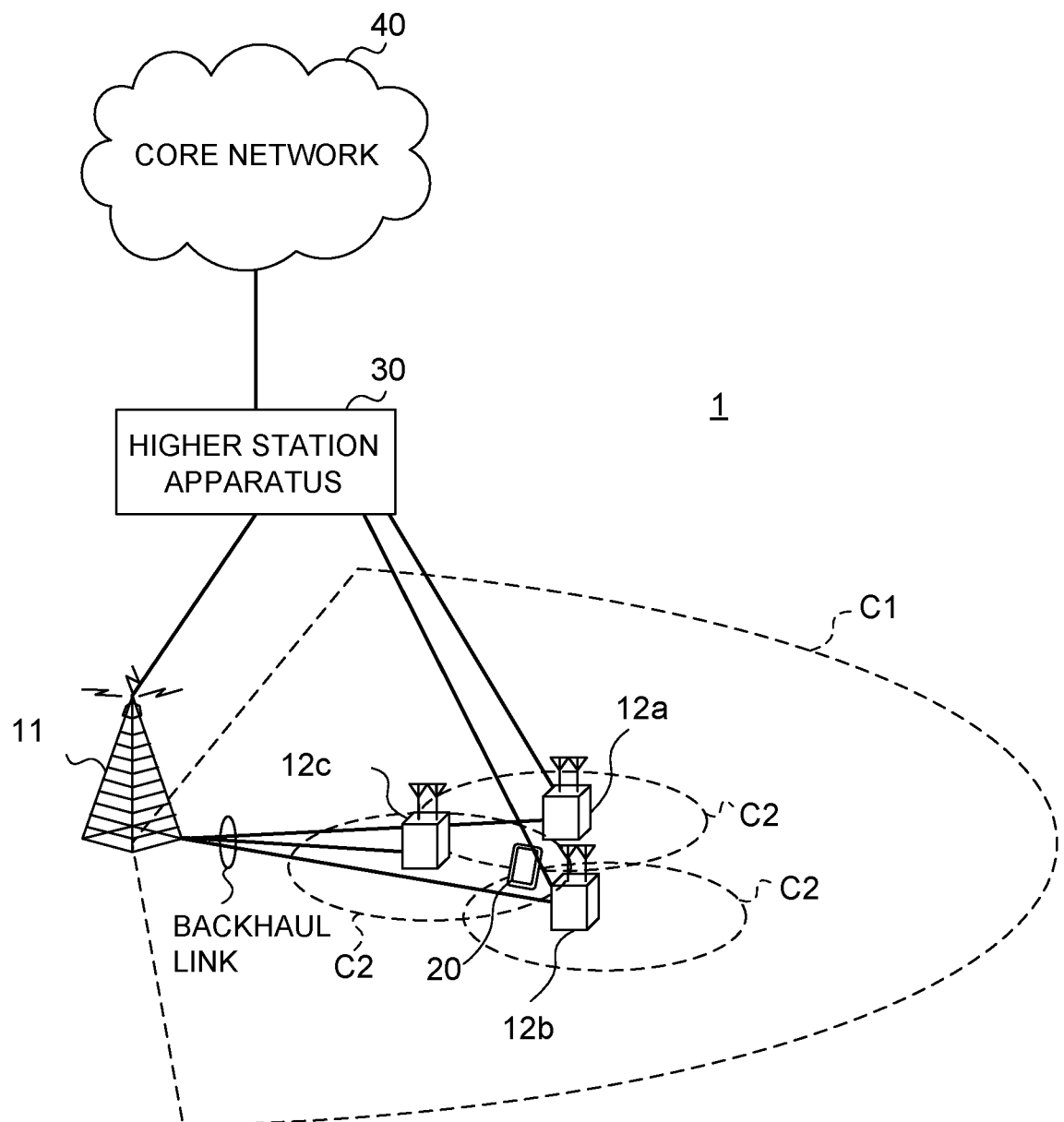
FIG. 7 is a diagram to show an example of a schematic configuration of a radio communication system according to the present embodiment.

FIG. 7 is a diagram to show an example of a schematic configuration of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)", "LTE-A (LTE-Advanced)", "LTE-B (LTE-Beyond)", "SUPER 3G", "IMT-Advanced", "4G (4th generation mobile communication system)", "5G (5th generation mobile communication system)", "NR (New Radio)", "FRA (Future Radio Access)", "New-RAT (Radio Access Technology)", and so on, or may be seen as a system to implement these.

The radio communication system 1 includes a radio base station 11 that forms a macro cell C1 covering a relatively wide coverage, and radio base stations 12 (12a to 12c) that are placed within the macro cell C1 and that form small cells C2, which are narrower than the macro cell C1. Also, user terminal 20 are placed in the macro cell C1 and in each small cell C2. The arrangement, number and so on of cells and user terminal 20 are not limited to those illustrated in the drawings.

The user terminal 20 can connect with both the radio base station 11 and the radio base stations 12. It is assumed that the user terminal 20 uses the macro cell C1 and the small cells C2 at the same time using CA or DC. Furthermore, the user terminal 20 may apply CA or DC using a plurality of cells (CCs).

Between the user terminal 20 and the radio base station 11, communication can be carried out using a carrier of a relatively low frequency band (for example, 2 GHz) and a narrow bandwidth (referred to as an "existing carrier", a "legacy carrier" and so on). Meanwhile, between the user terminal 20 and the radio base stations 12, a carrier of a relatively high frequency band (for example, 3.5 GHz, 5 GHz, and so on) and a wide bandwidth may be used, or the same carrier as that used between the user terminal 20 and the radio base station 11 may be used. Note that the configuration of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or channel, and may indicate, for example, at least one of subcarrier spacing, bandwidth, symbol length, cyclic prefix length, subframe length, TTI length, number of symbols per TTI, radio frame configuration, specific filtering processing performed by a transceiver in a frequency domain, specific windowing processing performed by a transceiver in a time domain and so on. For example, for a certain physical channel, when the subcarrier spacing differs and/or the numbers of OFDM symbols are different between the constituent OFDM symbols, this case may be described that they are different in numerology.

The radio base station 11 and the radio base station (or between 2 radio base stations 12) may be connected by wire (for example, means in compliance with the common public radio interface (CPRI) such as optical fiber, an X2 interface, and so on) or wirelessly.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station", an "aggregate node", an "eNB (eNodeB)", a "transmission/reception point" and so on. Also, the radio base stations 12 are radio base stations having local coverages, and may be referred to as "small base stations", "micro base stations", "pico base stations", "femto base stations", "HeNBs (Home eNodeBs)", "RRHs (Remote Radio Heads)", "transmission/reception points" and so on. Hereinafter the radio base stations 11 and 12 will be collectively referred to as "radio base stations 10", unless specified otherwise.

The user terminal 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are transmitted in the PDSCH. Further, MIB (Master Information Block) is transmitted by PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, and so on, is transmitted by the PDCCH.

DCI that schedules receipt of DL data may also be referred to as "DL assignment", and DCI that schedules transmission of UL data may also be referred to as "UL grant".

The number of OFDM symbols to use for the PDCCH is communicated by the PCFICH. HARQ (Hybrid Automatic Repeat reQuest) delivery acknowledgment information (also referred to as, for example, "retransmission control information", "HARQ-ACKs", "ACK/NACKs" and so on) in response to the PUSCH is communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information, and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (Sounding Reference Signals (SRSs)), demodulation reference signals (DMRSs), and so on are communicated as uplink reference signals. Note that, DMRSs may be referred to as "user terminal specific reference signals (UE-specific Reference Signals)". Also, the reference signals to be communicated are by no means limited to these.

<Radio Base Station>

Figure 8:
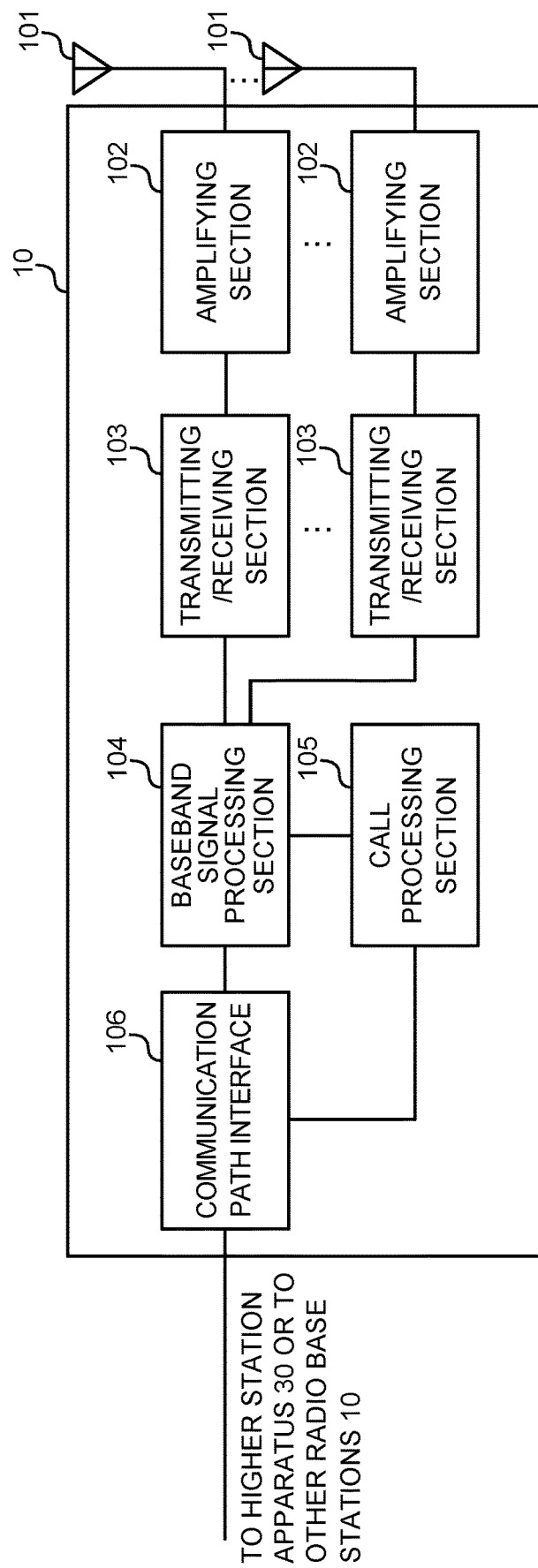
FIG. 8 is a diagram to show an example of an overall configuration of a radio base station according to the present embodiment.

FIG. 8 is a diagram to show an example of an overall configuration of a radio base station according to the present embodiment. The radio base station 10 includes a plurality of transmitting/receiving antennas 101, amplifying sections 102 and transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Each of the transmitting/receiving sections 103 converts a baseband signal, which is pre-coded for each antenna and output from the baseband signal processing section 104, into a signal in a radio frequency band, and transmits such a radio frequency signal. A radio frequency signal subjected to the frequency conversion in each transmitting/receiving section 103 is amplified in the amplifying section 102, and transmitted from each transmitting/receiving antenna 101. The transmitting/receiving sections 103 can be constituted by a transmitter/receiver, a transmitting/receiving circuit or transmitting/receiving apparatus that can be described based on general understanding of the technical field to which the present disclosure pertains. Note that a transmitting/receiving section 103 may be constituted as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving section 103 may further include an analog beamforming section that performs analog beamforming. The analog beamforming section may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 101 may be composed of an array antenna, for example.

Figure 9:
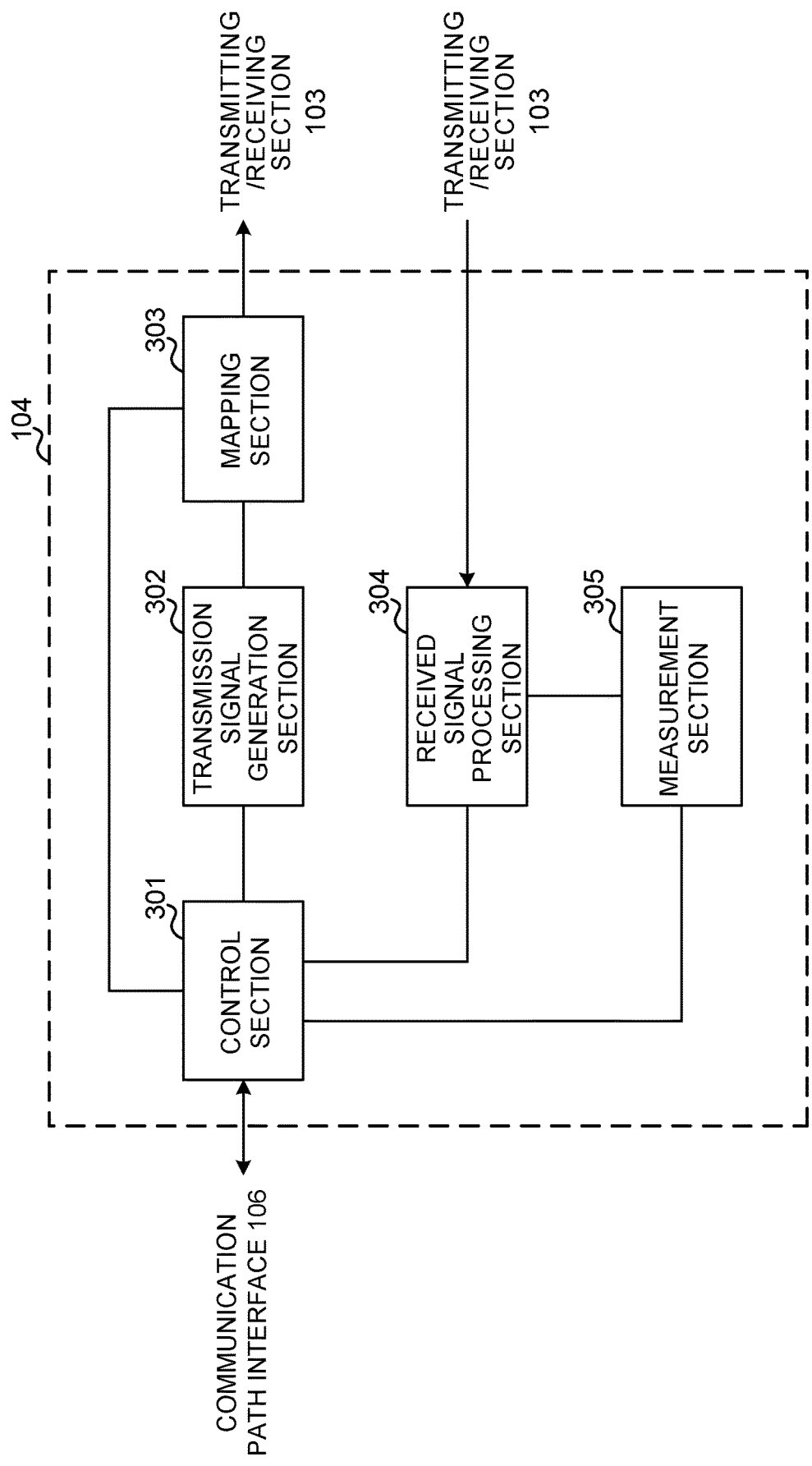
FIG. 9 is a diagram to show an example of a functional configuration of a radio base station according to the present embodiment.

FIG. 9 is a diagram to show an example of a functional configuration of a radio base station according to the present embodiment. Note that, although this example will primarily show functional blocks that pertain to characteristic parts of the present embodiment, the radio base station 10 may be assumed to have other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these configurations have only to be included in the radio base station 10, and some or all of the configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present disclosure pertains.

The control section 301, for example, controls the generation of signals in the transmission signal generation section 302, the allocation of signals by the mapping section 303 and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, such as delivery acknowledgement information). Scheduling (e.g., resource allocation) of delivery confirmation information). The control section 301 controls the generation of downlink control signals, downlink data signals and so on, based on the results of deciding whether or not retransmission control is necessary for uplink data signals, and so on.

The control section 301 controls the scheduling of synchronization signals (for example, the PSS (Primary Synchronization Signal)/SSS (Secondary Synchronization Signal)), SSB, downlink reference signals (for example, the CRS, the CSI-RS, the DMRS, etc.) and so on.

The control section 301 controls the scheduling for uplink data signals (for example, signals transmitted in the PUSCH), uplink control signals (for example, signals that are transmitted in the PUCCH and/or the PUSCH, and delivery acknowledgement information), random access preambles (for example, signals transmitted in the PRACH), uplink reference signals, and the like.

The control section 301 may perform control to form a transmission beam and/or a reception beam using a digital BF (for example, precoding) in the baseband signal processing section 104 and/or an analog BF (for example, phase rotation) in the transmitting/receiving section 103. The control section 301 may perform control to form the beams based on downlink propagation path information, uplink propagation path information, and the like. These pieces of propagation path information may be acquired from the received signal processing section 304 and/or the measurement section 305.

The transmission signal generation section 302 generates downlink signals (downlink control signals, downlink data signals, downlink reference signals and so on) based on instructions from the control section 301, and outputs these signals to the mapping section 303. The transmission signal generation section 302 can be constituted by a signal generator, a signal generating circuit or signal generation apparatus that can be described based on general understanding of the technical field to which the present disclosure pertains.

For example, the transmission signal generation section 302 generates DL assignments, which report downlink data assignment information, and/or UL grants, which report uplink data assignment information, based on the instruction from the control section 301. DL assignments and UL grants are both DCI, and follow the DCI format. Further, the downlink data signals are subjected to coding processing and modulation processing in accordance with a coding rate and a modulation scheme, which are determined based on channel state information (CSI) reported from each user terminal 20.

The mapping section 303 maps the downlink signals generated in the transmission signal generation section 302 to given radio resources based on instructions from the control section 301, and outputs these to the transmitting/receiving sections 103. The mapping section 303 can be constituted by a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals include, for example, uplink signals (uplink control signals, uplink data signals, uplink reference signals, etc.) that are transmitted from the user terminal 20. The received signal processing section 304 can be constituted by a signal processor, a signal processing circuit or signal processing apparatus that can be described based on general understanding of the technical field to which the present disclosure pertains.

The received signal processing section 304 outputs, to the control section 301, information decoded by the receiving processing. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and the like based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio)), the signal strength (for example, RSSI (Received Signal Strength Indicator)), propagation path information (for example, CSI), and so on. The measurement results may be output to the control section 301.

Note that the transmitting/receiving sections 103 may transmit the downlink control information (DCI) (DL assignments or the like) for scheduling the downlink shared channel (for example, PDSCH).

Moreover, the transmitting/receiving sections 103 may be so configured that, in case the downlink shared channel is transmitted by repeated transmission, the PDSCH transmitted is for at least part of the repetitions. Moreover, the transmitting/receiving sections 103 may be so configured to transmit DCI for scheduling all the repetitions of the downlink shared channels. Moreover, the transmitting/receiving section 103 may be so configured to transmit the DCI for scheduling repeated transmission of the downlink shared channel performed with a change made for each given number of repetitions.

Moreover, the control section 301 may be so configured to control the repeated transmission of the downlink shared channel. More specifically, the control section 301 may be so configured to control the transmission of the PDSCH, in which the PDSCH is transmitted from different transmission/reception points for each given number of repetitions.

Moreover, the control section 301 may be so configured to control at least either generation or transmission of the DCI used for scheduling all of the repetitions of the downlink shared channel. Moreover, the control section 301 may be so configured to control at least either generation or transmission of the DCI used for scheduling the repetitions of the downlink shared channel transmitted with a change made for each given number of times.

<User Terminal>

Figure 10:
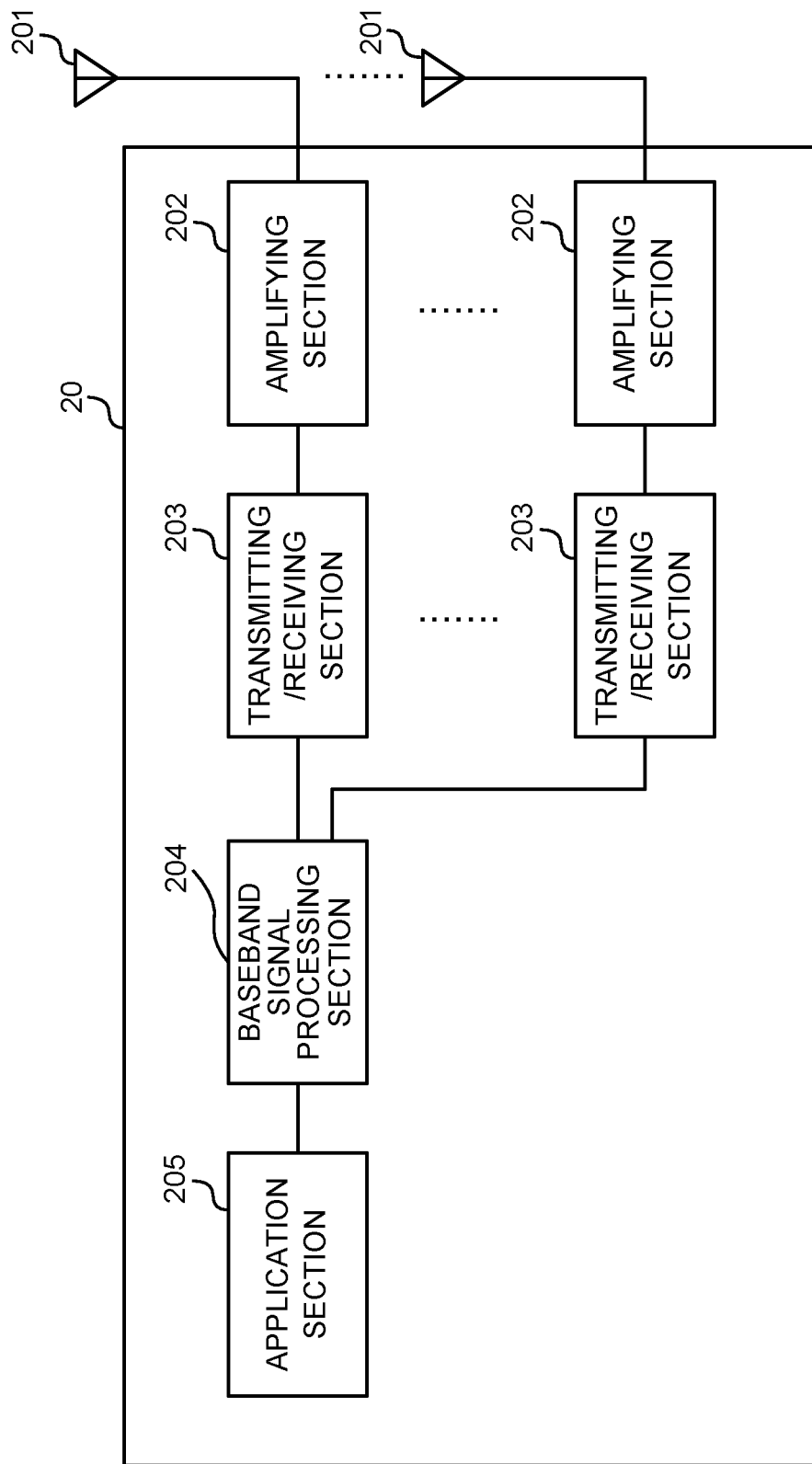
FIG. 10 is a diagram to show an example of an overall configuration of a user terminal according to the present embodiment.

FIG. 10 is a diagram to show an example of an overall configuration of a user terminal according to the present embodiment. The user terminal 20 includes a plurality of transmitting/receiving antennas 201, amplifying sections 202 and transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving section 203 receives the downlink signal amplified in the amplifying section 202. The transmitting/receiving section 203 performs frequency conversion for the received signal into baseband signal, and outputs the baseband signal to the baseband signal processing section 204. The transmitting/receiving section 203 can be constituted by a transmitter/receiver, a transmitting/receiving circuit or transmitting/ receiving apparatus that can be described based on general understanding of the technical field to which the present disclosure pertains. Note that a transmitting/receiving section 203 may be constituted as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beamforming section that performs analog beamforming. The analog beamforming section may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 201 may be composed of an array antenna, for example.

Figure 11:
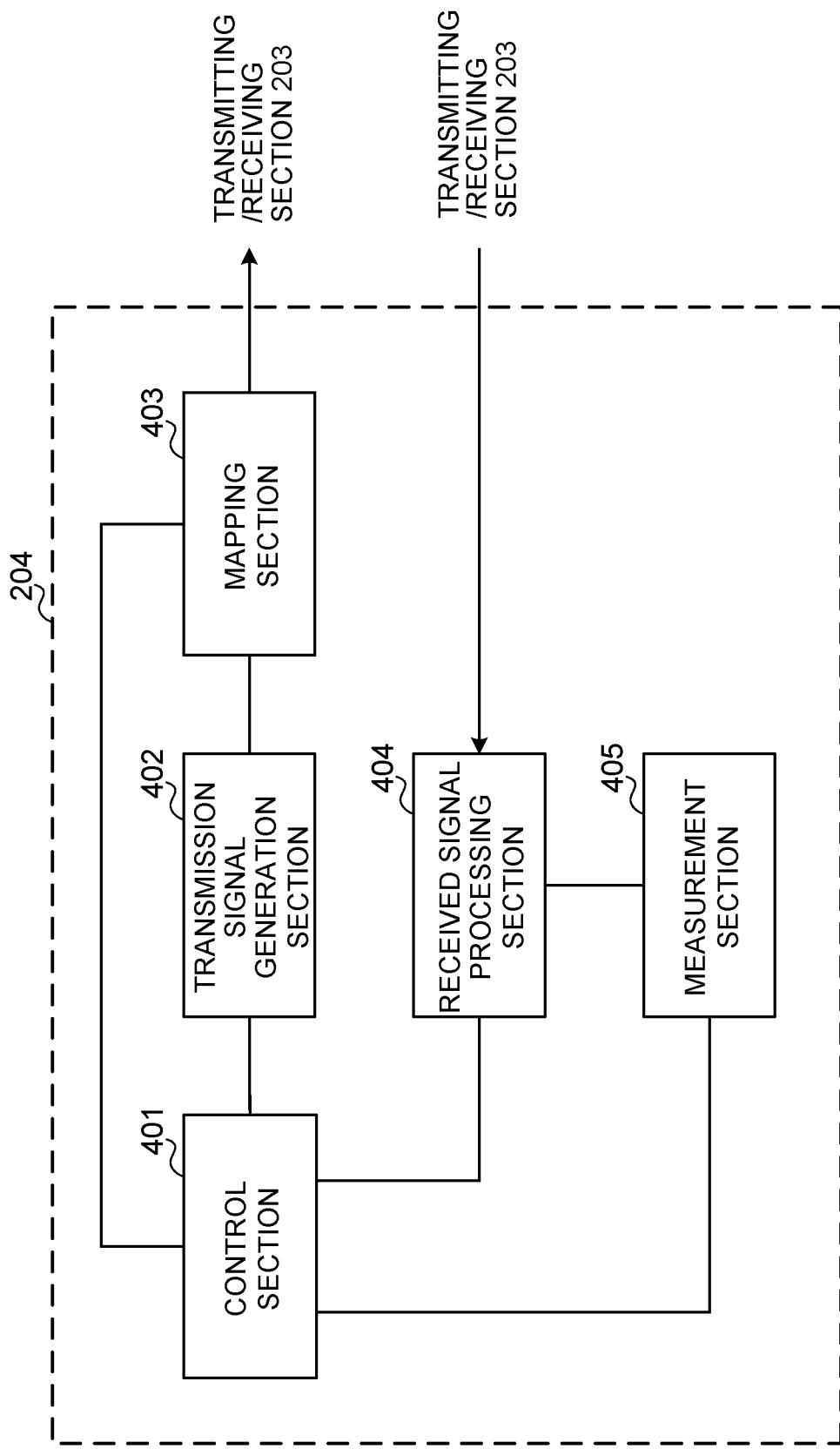
FIG. 11 is a diagram to show an example of a functional configuration of a user terminal according to the present embodiment.

FIG. 11 is a diagram to show an example of a functional configuration of a user terminal according to the present embodiment. Note that, although this example will primarily show functional blocks that pertain to characteristic parts of the present embodiment, it may be assumed that the user terminal 20 have other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit or control apparatus that can be described based on general understanding of the technical field to which the present disclosure pertains.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405 and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may perform control to form a transmission beam and/or a reception beam using a digital BF (for example, precoding) in the baseband signal processing section 204 and/or an analog BF (for example, phase rotation) in the transmitting/receiving section 203. The control section 401 may perform control to form the beams based on downlink propagation path information, uplink propagation path information and so on. These pieces of propagation path information may be acquired from the received signal processing section 404 and/or the measurement section 405.

Further, when the control section 401 acquires various information reported from the radio base station 10 from the received signal processing section 404, the control section 401 may update the parameter used for control based on the information.

The transmission signal generation section 402 generates uplink signals (uplink control signals, uplink data signals, uplink reference signals, etc.) based on instructions from the control section 401, and outputs these signals to the mapping section 403. The transmission signal generation section 402 can be constituted by a signal generator, a signal generating circuit or signal generation apparatus that can be described based on general understanding of the technical field to which the present disclosure pertains.

For example, the transmission signal generation section 402 generates uplink control signals such as delivery acknowledgement information, channel state information (CSI) and so on, based on instructions from the control section 401. Also, the transmission signal generation section 402 generates uplink data signals based on instructions from the control section 401. For example, when a UL grant is included in a downlink control signal that is reported from the radio base station 10, the control section 401 instructs the transmission signal generation section 402 to generate an uplink data signal.

The mapping section 403 maps the uplink signals generated in the transmission signal generation section 402 to radio resources based on instructions from the control section 401, and output the result to the transmitting/receiving section 203. The mapping section 403 can be constituted by a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the receiving processes to the control section 401. The received signal processing section 404 outputs, for example, broadcast information, system information, RRC signaling, DCI, and so on, to the control section 401. Also, the received signal processing section 404 outputs the received signals and/or the signals after the receiving processes to the measurement section 405.

The measurement section 405 conducts measurements with respect to the received signals. For example, the measurement section 405 may perform same frequency measurement and/or different frequency measurement for one or both of the first carrier and the second carrier. When the serving cell is included in the first carrier, the measurement section 405 may perform the different frequency measurement in the second carrier based on a measurement instruction acquired from the received signal processing section 404. The measurement section 405 can be constituted by a measurer, a measurement circuit or measurement apparatus that can be described based on general understanding of the technical field to which the present disclosure pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), propagation path information (for example, CSI), and so on. The measurement results may be output to the control section 401.

Note that the transmitting/receiving sections 203 may receive the downlink control information (DCI) (DL assignments or the like) for scheduling the downlink shared channel (for example, PDSCH).

Moreover, the transmitting/receiving section 203 may be so configured that, in case where the downlink shared channel is transmitted by repeated transmission, the transmitting/receiving section 203 receives the downlink shared channel from different transmission/reception points for each given number of repetitions. Moreover, the transmitting/receiving sections 203 may be so configured to receive DCI for scheduling all the repetitions of the downlink shared channels. Moreover, the transmitting/receiving section 203 may be so configured to receive the DCI for scheduling repeated transmission of the downlink shared channel performed with a change made for each given number of repetitions.

Moreover, the control section 401 may be so configured that the control section 401 controls the reception of the DCI used for scheduling all of the repetitions of the PDSCHs. Moreover, the control section 401 may be so configured that the control section 401 controls the DCI used for scheduling the transmission of repetitions of the PDSCHs with a change made for each given number of repetitions.

The control section 401 may be so configured to control the reception of the downlink shared channel on the basis of a transmission configuration indicator (TCI) state associated with a repetition among a given number of repetitions or a redundancy version of the downlink shared channel from a transmission/reception point among transmission/reception points changed over in such a way that the repetition transmission of the downlink channel is transmitted from different transmission/reception points for each given number of repetitions.

The control section 401 may assume that one or more antenna ports for reference signal demodulation of the downlink shared channel are quasi-co-located with a downlink reference signal indicated by the TCI state.

The control section 401 may be so configured to control reception of downlink control information used for scheduling all the repetitions of the downlink shared channel. It may be so configured that a given field value in the downlink control information indicates the TCI state for the repetition or the redundancy version. It may be so configured that the given field value or a field value other than the given field value in the downlink control information indicates the overall number of the repetitions.

The control section 401 may be so configured to control the reception of the downlink control information used for scheduling the downlink shared channel with a change made for each given number of repetition. It may be so configured that a given field value in the downlink control information indicates the TCI state for a repetition among the given number of repetitions. It may be so configured that a field value in the downlink control information indicates the redundancy version of a repetition among the given number of repetitions.

(Hardware Configuration)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses.

Figure 12:
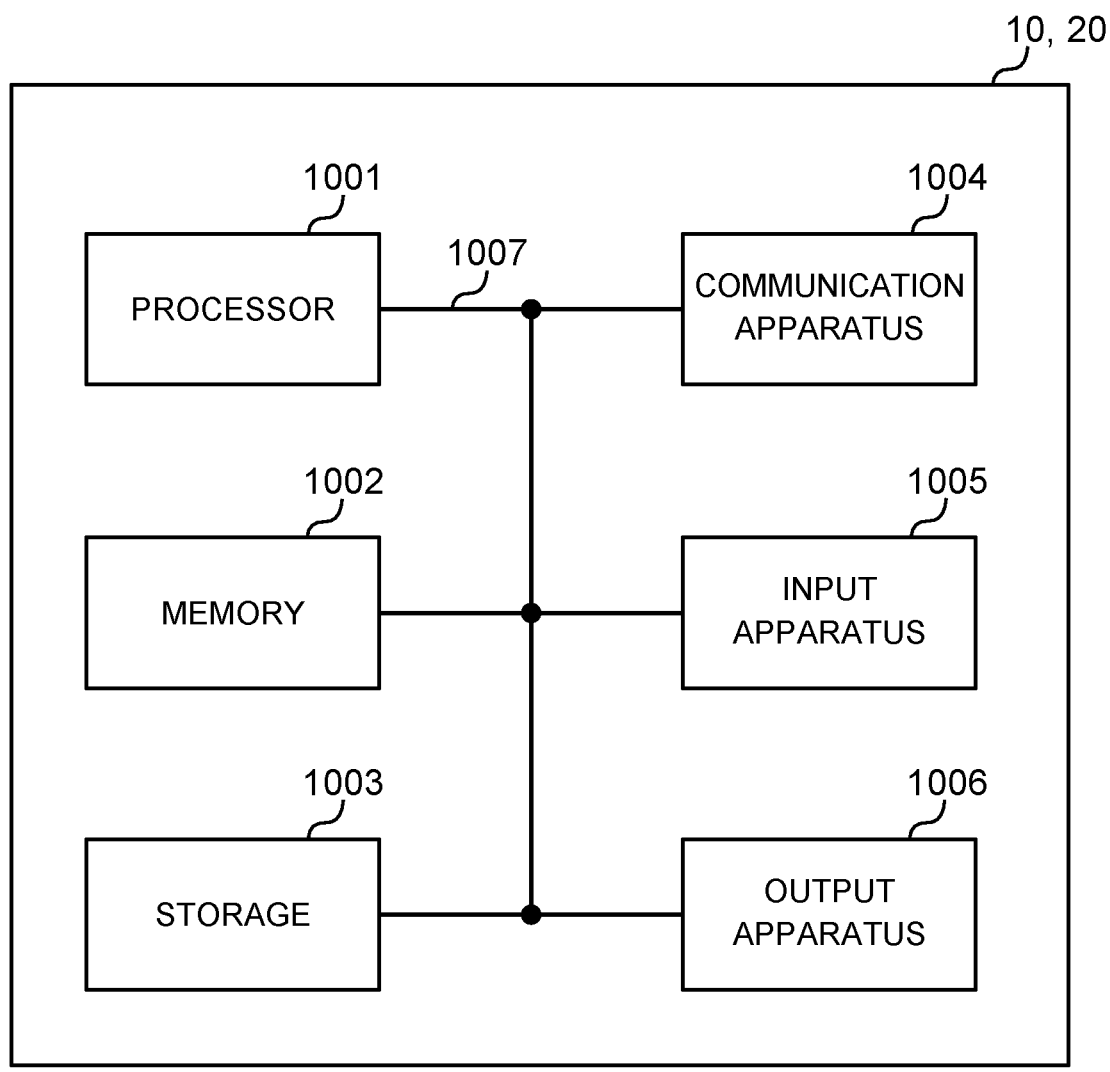
FIG. 12 is a diagram to show an example of a hardware configuration of the radio base station and the user terminal according to the present embodiment.

For example, the radio base station, user terminal, and so on according to embodiments of the present disclosure may function as a computer that executes the processes of the radio communication method of the present disclosure. FIG. 12 is a diagram showing an example of a hardware configuration of the radio base station and the user terminal according to the embodiment. Physically, the above-described radio base stations 10 and user terminal 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit", "device", "unit" and so on. Note that the hardware configuration of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with peripheral equipment, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, or data, from at least one of the storage 1003 and the communication apparatus 1004, into the memory 1002, and executes various processes according to these. As for the programs, programs to allow computers to execute at least part of the operations described in the above-described embodiments may be used. For example, the control section 401 of the user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory (main storage device)" and so on. The memory 1002 can store a program (program code), a software module, and the like, which are executable for implementing the radio communication method according to the embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer and so on in order to implement, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced with other terms that convey the same or similar meanings. For example, at least one of "channels" and "symbols" may be replaced by "signals" (or "signaling"). The signal may also be a message. A reference signal may be abbreviated as an RS, and may be referred to as a pilot, a pilot signal, and so on, depending on which standard applies. Furthermore, a "component carrier (CC)" may be referred to as a "cell", a "frequency carrier", a "carrier frequency" and so on.

A radio frame may be comprised of one or more periods (frames) in the time domain. Each of one or a plurality of periods (frames) constituting a radio frame may be referred to as a subframe. Furthermore, a subframe may be comprised of one or a plurality of slots in the time domain. A subframe may be a fixed time duration (for example, 1 ms) that is not dependent on numerology.

Here, the numerology can be a communication parameter applied to at least one of transmission and reception of a certain signal or channel. The numerology can indicate, in one example, at least one of subcarrier spacing (SCS), bandwidth, symbol length, cyclic prefix length, subframe length, transmission time interval (TTI), the number of symbols per TTI, the radio frame configuration, particular filtering processing performed by the transceiver in frequency domains, particular windowing processing performed by a transceiver in time domains, and so on.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology.

A slot may include a plurality of mini slots. Each mini slot may be comprised of one or more symbols in the time domain. Also, a mini slot may be referred to as a "subslot". Each mini slot may be comprised of fewer symbols than a slot. A PDSCH (or PUSCH) transmitted in a time unit larger than a mini slot may be referred to as PDSCH (PUSCH) mapping type A. A PDSCH (or PUSCH) transmitted using a mini-slot may be referred to as "PDSCH (PUSCH) mapping type B".

A radio frame, a subframe, a slot, a mini slot and a symbol all represent the time unit in signal communication. A radio frame, a subframe, a slot, a mini slot and a symbol may be each called by other applicable names. Moreover, the time units such as frames, subframes, slots, mini-slots, and symbols herein are used interchangeably.

For example, one subframe may be referred to as a "transmission time interval (TTI)", or a plurality of consecutive subframes may be referred to as a "TTI", or one slot or mini-slot may be referred to as a "TTI". That is, at least one of a subframe and a TTI may be a subframe (1 ms) in the existing LTE, may be a shorter period than 1 ms (for example, one to thirteen symbols), or may be a longer period of time than 1 ms. Note that the unit to represent the TTI may be referred to as a "slot", a "mini slot" and so on, instead of a "subframe".

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks, codewords and so on, or may be the unit of processing in scheduling, link adaptation and so on. When TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or multiple slots or one or more mini slots) may be the minimum time unit of scheduling. Also, the number of slots (the number of mini slots) to constitute this minimum time unit of scheduling may be controlled.

TTI having a time length of 1 ms may be called usual TTI (TTI in LTE Rel. 8 to 12), normal TTI, long TTI, a usual subframe, a normal subframe, a long subframe, a slot, or the like. A TTI that is shorter than a usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB can be the same regardless of the numerology, and in one example, it can be 12. The number of subcarriers included in the RB can be determined on the basis of numerology.

Also, an RB may include one or more symbols in the time domain, and may be one slot, one mini slot, one subframe or one TTI in length. One TTI, one subframe, or the like can be constituted as one or a plurality of resource blocks.

Note that one or more RBs may be referred to as a "physical resource block (PRB (Physical RB))", a "subcarrier group (SCG)", a "resource element group (REG)", a "PRB pair", an "RB pair" and so on.

Furthermore, a resource block may be comprised of one or more resource elements (REs). For example, one RE may be a radio resource field of one subcarrier and one symbol.

A bandwidth part (BWP) (also be referred to as a partial bandwidth) can represent a subset of consecutive common resource blocks (RBs) for a certain numerology in a certain carrier. Here, the common RB can be specified by the index of the RB using the common reference point of the carrier as a reference. The PRB can be defined in a certain BWP and be numbered within the BWP.

The BWP can include a BWP for UL (UL BWP) and a BWP for DL (DL BWP). For the UE, one or a plurality of BWPs can be configured in one carrier.

At least one of the configured BWPs can be active, and the UE may not necessarily assume that it will transmit and receive given signals/channels outside the active BWP.

Moreover, terms "cell", "carrier", and the like are herein used interchangeably with "BWP".

Note that the structures of radio frames, subframes, slots, mini slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in the present disclosure may be represented in absolute values or in relative values with respect to given values, or may be represented using other applicable information. For example, a radio resource may be specified by a given index.

The names used for parameters and so on in the present disclosure are in no respect limiting. In addition, an equation and so on using these parameters may differ from those explicitly disclosed in the present disclosure. Since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and so on that are input and/or output can be overwritten, updated, or appended. The information, signals, and so on that are output may be deleted. The information, signals and so on that are input may be transmitted to other pieces of apparatus.

The reporting of information is by no means limited to the aspects/embodiments described in the present disclosure, and may be performed using other methods. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)", "L1 control information (L1 control signal)" and so on. Also, RRC signaling may be referred to as RRC messages, and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

The terms such as "precoding", "precoder", "weight (precoding weight)", "transmission power", "phase rotation", "antenna port", "layer", "number of layers", "rank", "beam", "beam width", "beam angle", "antenna", "antenna element", and "panel" can be herein used interchangeably.

The terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" can be herein used interchangeably. The base station may be called a term such as a macro cell, a small cell, a femto cell, a pico cell, and the like.

The base station is capable of covering one or a plurality of (e.g., three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station and a base station subsystem that provides communication services within this coverage.

In the present disclosure, the terms "mobile station (MS)", "user equipment", "user equipment (UE)", "terminal", etc. may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be referred to as transmitting apparatus, receiving apparatus and so on. Note that at least one of the base station and the mobile station may be a device mounted on a mobile unit, a mobile unit itself, or the like. The mobile unit may be a vehicle (such as a car, an airplane, for example), an unmanned mobile unit (such as a drone, an autonomous vehicle, for example), or a robot (manned or unmanned). Note that at least one of the base station and the mobile station also includes a device that does not necessarily move during a communication operation.

Furthermore, the radio base stations in the present disclosure may be interpreted as user terminal. For example, each aspect/embodiment of the present disclosure may be applied to a configuration in which communication between a radio base station and a user terminal is replaced by communication among a plurality of user terminal (which may be referred to as, for example, D2D (Device-to-Device), V2X (Vehicle-to-Everything) and so on). In this case, the user terminal 20 may have the functions of the radio base stations 10 described above. In addition, the wording such as "up" and "down" may be replaced with the wording corresponding to the terminal-to-terminal communication (for example, "side"). For example, an uplink channel and a downlink channel may be interpreted as a side channel.

Likewise, the user terminal in the present disclosure may be interpreted as radio base stations. In this case, the radio base stations 10 may have the functions of the user terminal 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts and so on that have been used to describe the aspects/embodiments in the present disclosure may be re-ordered as long as inconsistencies do not arise. For example, although various methods have been illustrated in the present disclosure with various components of steps using exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second" and so on as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The terms "judge" and "determine" as used in the present disclosure may encompass a wide variety of actions. For example, "determining" may be regarded as "determining" judging, calculating, computing, processing, deriving, investigating, looking up (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, to "judge" and "determine" as used herein may be interpreted to mean "assuming", "expecting", "considering", and so on.

The term "maximum transmission power" described in the present disclosure may mean the maximum value of transmission power, the nominal UE maximum transmit power, or the rated UE maximum transmit power.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced by "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other". Moreover, this term can mean that "A and B are different from C". The terms such as "separate" or "coupled" can be construed similarly as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of the claims. Consequently, the description in the present disclosure is provided only for the purpose of explaining examples, and should by no means be construed to limit the invention according to the present disclosure in any way.

The invention claimed is:

1. A terminal comprising:
   a receiver that receives configuration of a plurality of physical downlink shared channel (PDSCH) transmissions which are repetitions of a same transport block; and
   a processor that applies one of a plurality of transmission configuration indication (TCI) states to one or more PDSCH transmissions among the plurality of PDSCH transmissions,
   wherein a redundancy version applied to one PDSCH transmission among the plurality of PDSCH transmissions is based on a TCI state corresponding to the one PDSCH transmission.

2. The terminal according to claim 1, wherein the receiver performs one reception of downlink control information for scheduling the plurality of PDSCH transmissions, the downlink control information including a field which indicates the plurality of TCI states.

3. The terminal according to claim 2, wherein the configuration includes a number of the plurality of PDSCH transmissions.

4. The terminal according to claim 2, wherein the plurality of PDSCH transmissions have resources different in a time domain.

5. The terminal according to claim 2, wherein the plurality of PDSCH transmissions have resources different in a frequency domain.

6. The terminal according to claim 1, wherein the configuration includes a number of the plurality of PDSCH transmissions.

7. The terminal according to claim 1, wherein the plurality of PDSCH transmissions have resources different in a time domain.

8. The terminal according to claim 1, wherein the plurality of PDSCH transmissions have resources different in a frequency domain.

9. A radio communication method for a terminal, comprising:
   receiving configuration of a plurality of physical downlink shared channel (PDSCH) transmissions which are repetitions of a same transport block; and
   applying one of a plurality of transmission configuration indication (TCI) states to one or more PDSCH transmissions among the plurality of PDSCH transmissions, wherein a redundancy version applied to one PDSCH transmission among the plurality of PDSCH transmissions is based on a TCI state corresponding to the one PDSCH transmission.

10. A base station comprising:
a transmitter that transmits configuration of a plurality of physical downlink shared channel (PDSCH) transmissions which are repetitions of a same transport block; and
a processor that applies one of a plurality of transmission configuration indication (TCI) states to one or more PDSCH transmissions among the plurality of PDSCH transmissions,
wherein a redundancy version applied to one PDSCH transmission among the plurality of PDSCH transmissions is based on a TCI state corresponding to the one PDSCH transmission.

11. A system comprising a terminal and a base station, wherein the terminal comprises:
a receiver that receives configuration of a plurality of physical downlink shared channel (PDSCH) transmissions which are repetitions of a same transport block; and
a processor that applies one of a plurality of transmission configuration indication (TCI) states to one or more PDSCH transmissions among the plurality of PDSCH transmissions, and
the base station transmits the configuration,
wherein a redundancy version applied to one PDSCH transmission among the plurality of PDSCH transmissions is based on a TCI state corresponding to the one PDSCH transmission.

* * * * *